United States Patent
Stammer et al.

(10) Patent No.: US 11,186,684 B2
(45) Date of Patent: Nov. 30, 2021

(54) METHOD FOR CONTINUOUSLY PRODUCING A POLYAMIDE POWDER

(71) Applicant: BASF SE, Ludwigshafen am Rhein (DE)

(72) Inventors: Achim Stammer, Ludwigshafen am Rhein (DE); Simon Gramlich, Ludwigshafen am Rhein (DE); Andreas Bauder, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 17/258,794

(22) PCT Filed: Jul. 10, 2019

(86) PCT No.: PCT/EP2019/068594
§ 371 (c)(1),
(2) Date: Jan. 8, 2021

(87) PCT Pub. No.: WO2020/011878
PCT Pub. Date: Jan. 16, 2020

(65) Prior Publication Data
US 2021/0269596 A1    Sep. 2, 2021

(30) Foreign Application Priority Data
Jul. 10, 2018  (EP) .................................... 18182721

(51) Int. Cl.
*C08G 69/16*  (2006.01)
*C08G 69/28*  (2006.01)
*C08J 3/14*   (2006.01)
*C08G 69/06*  (2006.01)
*B33Y 70/00*  (2020.01)
*B33Y 10/00*  (2015.01)

(52) U.S. Cl.
CPC .............. *C08G 69/06* (2013.01); *B33Y 10/00* (2014.12); *B33Y 70/00* (2014.12); *C08G 69/16* (2013.01); *C08G 69/28* (2013.01); *C08J 3/14* (2013.01); *C08J 2377/02* (2013.01)

(58) Field of Classification Search
None
See application file for complete search history.

(56) References Cited

U.S. PATENT DOCUMENTS

| 3,446,782 A * | 5/1969 | Masaru ...................... C08J 3/12 |
| | | 528/323 |
| 5,648,450 A | 7/1997 | Dickens et al. |
| 6,136,948 A | 10/2000 | Dickens et al. |

FOREIGN PATENT DOCUMENTS

| WO | 96/06881 A2 | 3/1996 |
| WO | 2017/140795 A1 | 8/2017 |
| WO | 2018/115767 A1 | 6/2018 |
| WO | 2018/141631 A1 | 8/2018 |

OTHER PUBLICATIONS

International Preliminary Report on Patentability received for PCT Patent Application No. PCT/EP2019/068594, dated Jan. 14, 2021, 7 pages.
International Search Report and Written Opinion received for PCT Patent Application No. PCT/EP2019/068594, dated Sep. 27, 2019, 12 pages (3 pages of English Translation and 9 pages of Original Document).
Verbelen, L., et al., "Characterization of polyamide powders for determination of laser sintering processability", European Polymer Journal, vol. 75, pp. 163-174.

* cited by examiner

*Primary Examiner* — Tae H Yoon
(74) *Attorney, Agent, or Firm* — Faegre Drinker Biddle & Reath LLP

(57) ABSTRACT

The present invention relates to a process for continuously producing a polyamide powder (PP) comprising at least one semicrystalline polyamide (P). The present invention further relates to the polyamide powder (PP) thus obtainable and to the use of the polyamide powder (PP) as sinter powder (SP), and also to a process for producing a shaped body by exposing a layer of a polyamide powder (PP).

12 Claims, 1 Drawing Sheet

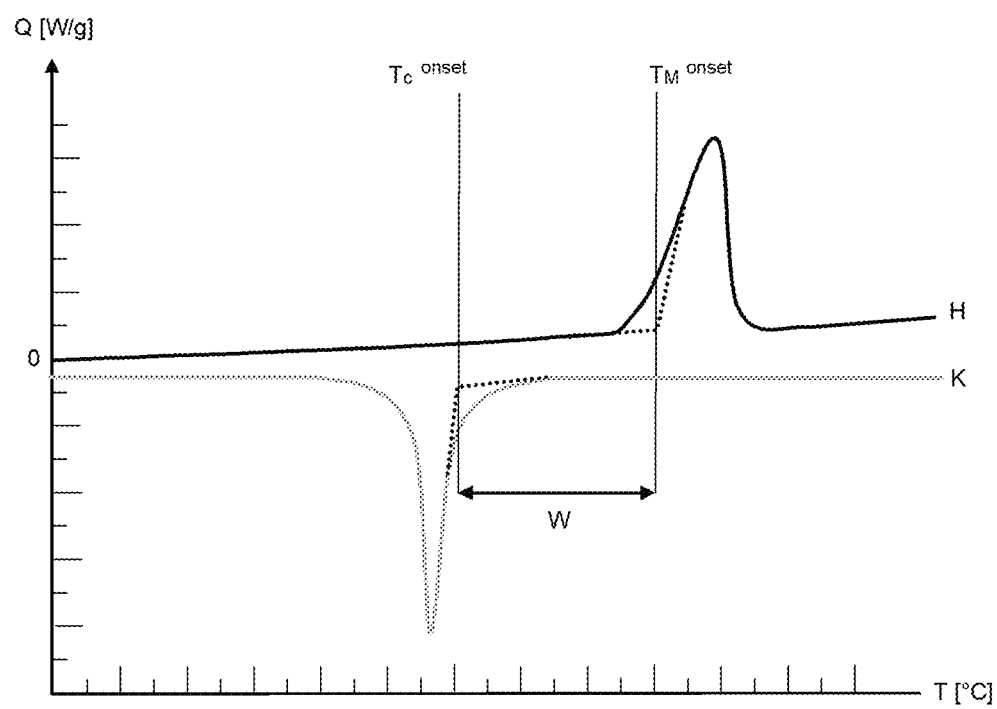

METHOD FOR CONTINUOUSLY PRODUCING A POLYAMIDE POWDER

CROSS-REFERENCE TO RELATED APPLICATIONS

This application is a national stage application (under 35 U.S.C. § 371) of PCT/EP2019/068594, filed Jul. 10, 2019, which claims benefit of European Application No. 18182721.3, filed Jul. 10, 2018, both of which are incorporated herein by reference in their entirety.

The present invention relates to a process for continuously producing a polyamide powder (PP) comprising at least one semicrystalline polyamide (P). The present invention further relates to the polyamide powder (PP) thus obtainable and to the use of the polyamide powder (PP) as sinter powder (SP), and also to a process for producing a shaped body by exposing a layer of a polyamide powder (PP).

The rapid provision of prototypes is a problem often addressed in recent times. One method which is particularly suitable for this "rapid prototyping" is selective laser sintering (SLS). This involves selectively exposing to a plastic powder in a chamber with a laser beam. The powder melts; the molten particles coalesce and resolidify. Repeated application of plastic powder and subsequent exposure to a laser allows modeling of three-dimensional shaped bodies.

The method of selective laser sintering for producing shaped bodies from pulverulent polymers is described in detail in patent specifications U.S. Pat. No. 6,136,948 and WO 96/06881.

Selective laser sintering is frequently too time-consuming for the production of a relatively large number of shaped bodies, and so it is possible to produce relatively large volumes of shaped bodies using high-speed sintering (HSS) or "multijet fusion technology" (MJF) from HP. In high-speed sintering, by spray application of an infrared-absorbing ink onto the component cross section to be sintered, followed by exposure with an infrared source, a higher processing speed is achieved compared to selective laser sintering.

Suitable sinter powders in selective laser sintering (SLS), in high-speed sintering (HSS) or in what is called multijet fusion technology (MJF) are especially polyamide powders. The prior art describes various polyamide powders that can be used as sinter powders, and processes for production thereof. For example, the polyamide powders are produced by grinding or by precipitation.

In the case of grinding, a polyamide and optionally additions and/or additives are introduced into a mill and ground therein, preferably while cooling with liquid nitrogen, to obtain the polyamide powder (cryogenic grinding).

A disadvantage in this process, however, is that the yield of polyamide powder that can be used as sinter powder is frequently very small since the polyamide powders produced by grinding frequently have too broad a particle size distribution.

If the polyamide powder is produced by precipitation, the polyamide and optionally additions and/or additives are typically first mixed with a solvent, and the polyamide is dissolved in the solvent, optionally while heating, to obtain a polyamide solution. The polyamide powder is subsequently precipitated, for example, by cooling the polyamide solution, distilling the solvent out of the polyamide solution or adding a precipitant to the polyamide solution.

The production of the polyamide powder by precipitation is typically effected by what is called the batchwise method, meaning that the different component steps of the precipitation are performed successively in the same apparatus.

However, it is a disadvantage in this method that, in order to obtain a large amount of polyamide powder, it is necessary to use an apparatus of high capacity, which means that the mixing of polyamide, solvent and any additions and/or additives is frequently inadequate. This often leads to low sphericity and to a broad particle size distribution of the polyamide powder obtained. Furthermore, temperature monitoring and control in the individual component steps of the precipitation in batchwise mode is frequently difficult and slow.

It is thus an object of the present invention to provide a process for producing a polyamide powder (PP), wherein the polyamide powder (PP) is especially to be suitable for use as sinter powder (SP) in a selective laser sintering method, in high-speed sintering (HSS) or in what is called multijet fusion technology (MJF). The abovementioned disadvantages of the processes and sintering powders described in the prior art should be absent or much reduced in the process and the polyamide powder (PP) obtainable therefrom. The process should additionally be performable in a very simple and inexpensive manner.

This object is achieved by a process for continuously producing a polyamide powder (PP) comprising at least one semicrystalline polyamide (P), comprising the steps of a) producing a solution (L) comprising the at least one semicrystalline polyamide (P) dissolved in a solvent (LM), wherein the solvent (LM) used is a mixture comprising in the range from 30% to 60% by weight of lactam and in the range from 40% to 70% by weight of water, based on the total weight of the mixture, comprising the steps of a1) mixing a melt (S) comprising the at least one semicrystalline polyamide (P) in molten form with the solvent (LM) in a mixing apparatus (MV) to obtain a dispersion (D) comprising the at least one semicrystalline polyamide (P) dispersed in the solvent (LM), by supplying the melt (S) and the solvent (LM) continuously to the mixing apparatus (MV), a2) continuously transferring the dispersion (D) obtained in step a1) from the mixing apparatus (MV) into a dwell apparatus (VV) in which the at least one dispersed semicrystalline polyamide (P) dissolves in the solvent (LM) to obtain the solution (L), wherein the solvent (LM), the dispersion (D) and the solution (L) are kept at a first temperature (T1) in step a2), b) continuously transferring the solution (L) obtained in step a) from the dwell apparatus (VV) into a precipitation apparatus (FV), wherein the solution (L) obtained in step a) is cooled in the precipitation apparatus (FV) to a second temperature (T2) to obtain a suspension (S) comprising the polyamide powder (PP) as suspended phase and the solvent (LM) as continuous phase, c) separating the polyamide powder (PP) from the suspension (S) obtained in step b).

It has been found that, surprisingly, the polyamide powder (PP) produced by the process of the invention has high sphericity and a particularly narrow particle size distribution, and is additionally of particularly good suitability for use in a selective laser sintering method, in high-speed sintering (HSS) or in multijet fusion technology (MJF). In addition, it is possible to optimally monitor and control the temperature in the process of the invention since the dissolving of the at least one semicrystalline polyamide (P) in the solvent (LM) (step a)) and the precipitating of the polyamide powder (PP) from solution (L) (step b)) can be performed in at least three spatially separate apparatuses.

Moreover, it is possible in the process of the invention to use apparatuses having a smaller volume than the apparatus in a process performed in batchwise mode. This shortens the time required for dissolving of the at least one semicrystalline polyamide (P) in the solvent (LM) and for precipitating of the polyamide powder (PP) out of the solution (L). As a result, the at least one semicrystalline polyamide (P) or the polyamide powder (PP) is subject to a lower level of thermal stress, such that the shaped bodies produced from the polyamide powder (PP) have good mechanical properties, especially a high modulus and good tensile strengths.

Moreover, the polyamide powder (PP) produced by the process of the invention is obtained in a particularly high yield compared to polyamide powders produced by grinding.

BRIEF DESCRIPTION OF THE DRAWING

The FIG. 1 shows a DSC diagram of $T_C$ and $T_M$.

The present invention is more particularly elucidated hereinbelow.

Semicrystalline Polyamide (P)

The polyamide powder (PP) produced in the process according to the invention comprises at least one semicrystalline polyamide (P).

In the context of the present invention, "at least one semicrystalline polyamide (P)" meant either exactly one semicrystalline polyamide (P) or else a mixture (blend) of two or more semicrystalline polyamides (P).

In the context of the present invention, "semicrystalline" means that the polyamide has an enthalpy of fusion $\Delta H2_{(A)}$ of >45 J/g, preferably of >50 J/g and especially preferably of >55 J/g, measured in each case by means of differential scanning calorimetry (DSC) to ISO 11357-4: 2014 at a heating rate of 20 K/min.

The at least one semicrystalline polyamide (P) also preferably has an enthalpy of fusion $\Delta H2_{(A)}$ of <200 J/g, particularly preferably of <175 J/g and especially preferably of <150 J/g, measured in each case by means of differential scanning calorimetry (DSC) to ISO 11357-4: 2014 at a cooling rate of 20 K/min.

Suitable examples of the at least one semicrystalline polyamide (P) are polyamides that derive from lactams having 7 to 13 ring members. Also suitable as the at least one semicrystalline polyamide (P) are polyamides obtained by reaction of dicarboxylic acids with diamines.

By way of example, polyamides that derive from lactams include polyamides that derive from caprolactam, caprylolactam and/or laurolactam.

Further suitable polyamides are obtainable from ω-aminoalkyl nitriles. Preferred ω-aminoalkyl nitrile is aminocapronitrile, which leads to nylon-6. Dinitriles may also be reacted with diamines. Preference is given here to adipodinitrile and hexamethylenediamine, the polymerization of which gives nylon-6,6. The polymerization of nitriles is preferably effected in the presence of water and is also known as direct polymerization.

If polyamides obtainable from dicarboxylic acids and diamines are used as the at least one semicrystalline polyamide (P), it is possible to use alkanedicarboxylic acids (aliphatic dicarboxylic acids) having 6 to 36 carbon atoms, preferably 6 to 12 carbon atoms and more preferably 6 to 10 carbon atoms. Aromatic dicarboxylic acids are also suitable.

Adipic acid, azelaic acid, sebacic acid, dodecanedioic acid and also terephthalic acid and/or isophthalic acid may be mentioned here by way of example as dicarboxylic acids.

Suitable diamines are, for example, alkanediamines having 4 to 36 carbon atoms, preferably alkanediamines having 6 to 12 carbon atoms, especially alkanediamines having 6 to 8 carbon atoms, and aromatic diamines, for example m-xylylenediamine, di(4-aminophenyl)methane, di(4-aminocyclohexyl)methane, 2,2-di(4-aminophenyl)propane and 2,2-di(4-aminocyclohexyl)propane and also 1,5-diamino-2-methylpentane.

Preference is given, as the at least one semicrystalline polyamide (P), to polyhexamethyleneadipamide, polyhexamethylenesebacamide and polycaprolactam and also nylon-6/6,6, especially having a proportion of 5% to 95% by weight of caprolactam units.

Also suitable are polyamides obtainable by copolymerization of two or more of the monomers recited hereinabove and hereinbelow or mixtures of a plurality of polyamides in any desired mixing ratio.

Suitable polyamides are accordingly aliphatic, semiaromatic or aromatic polyamides. The term "aliphatic polyamides" means that the polyamides are formed exclusively of aliphatic monomers. The term "semiaromatic polyamides" means that the polyamides are formed of both aliphatic and aromatic monomers. The term "aromatic polyamides" means that the polyamides are formed exclusively of aromatic monomers.

The nonexclusive list which follows comprises preferred semicrystalline polyamides for use as the at least one semicrystalline polyamide (P) in the process of the invention.

Ab Polymers:
  PA 4 pyrrolidone
  PA 6 ε-caprolactam
  PA 7 enantholactam
  PA 8 caprylolactam AA/BB Polymers:
  PA 46 tetramethylenediamine, adipic acid
  PA 66 hexamethylenediamine, adipic acid
  PA 69 hexamethylenediamine, azelaic acid
  PA 610 hexamethylenediamine, sebacic acid
  PA 612 hexamethylenediamine, decanedicarboxylic acid
  PA 613 hexamethylenediamine, undecanedicarboxylic acid
  PA 6T hexamethylenediamine, terephthalic acid
  PA MXD6 m-xylylenediamine, adipic acid
  PA 6/6I (see PA 6), hexamethylenediamine, isophthalic acid
  PA 6/6T (see PA 6 and PA 6T)
  PA 6/66 (see PA 6 and PA 66)
  PA 6/12 (see PA 6), laurylolactam
  PA 66/6/610 (see PA 66, PA 6 and PA 610)
  PA 6I/6T/PACM as PA 6I/6T and diaminodicyclohexylmethane
  PA 6/6I6T (see PA 6 and PA 6T), hexamethylenediamine, isophthalic acid The at least one semicrystalline polyamide (P) is preferably selected from the group consisting of PA 4, PA 6, PA 7, PA 8, PA 9, PA 11, PA 12, PA 46, PA 66, PA 69, PA 610, PA 612, PA 613, PA 1212, PA 1313, PA 6T, PA MXD6, PA 6/6T, PA 6/6I, PA 6/6I6T, PA 6.36, PA 6/66, PA 6/12, PA 66/6/610, PA PACM12, PA 6I/6T/PACM and copolyamides of two or more of the abovementioned polyamides.

The at least one semicrystalline polyamide (P) is particularly preferably selected from the group consisting of PA 6, PA 66, PA 610, PA 612, PA 6.36, PA 6/66, PA 6/6I6T, PA 6/6T and PA 6/6I.

The at least one semicrystalline polyamide (P) is especially preferably selected from the group consisting of PA 6, PA 66, PA 610, PA 6/66 and PA 6/6T.

The present invention accordingly also provides a process in which the at least one semicrystalline polyamide (P) is selected from the group consisting of PA 4, PA 6, PA 7, PA 8, PA 9, PA 11, PA 12, PA 46, PA 66, PA 69, PA 610, PA 612, PA 613, PA 1212, PA 1313, PA 6T, PA MXD6, PA 6/6T, PA 6/6I, PA 6/6I6T, PA 6.36, PA 6/66, PA 6/12, PA 66/6/610, PA PACM12, PA 6I/6T/PACM and copolyamides of two or more of the abovementioned polyamides.

The at least one semicrystalline polyamide (P) has a viscosity number ($VZ_{(P)}$) for example in the range from 70 to 350 ml/g, preferably of 70 to 240 ml/g. According to the invention, the viscosity number ($VZ_{(P)}$) of the at least one semicrystalline polyamide (P) is determined in a 0.5% by weight solution of the at least one semicrystalline polyamide (P) and in 96% by weight sulfuric acid at 25° C. according to ISO 307:2013-08.

The at least one semicrystalline polyamide (P) preferably has a weight-average molecular weight ($M_W$) in the range from 500 to 2 000 000 g/mol, more preferably in the range from 5000 to 500 000 g/mol and especially preferably in the range from 10 000 to 100 000 g/mol. Weight-average molecular weight ($M_w$) is determined to ASTM-D 4001.

The at least one semicrystalline polyamide (P) typically has a melting temperature ($T_{M(P)}$). The melting temperature ($T_{M(P)}$) of the at least one semicrystalline polyamide (P) is, for example, in the range from 70° C. to 300° C., preferably in the range from 180° C. to 295° C.

The melting temperature ($T_{M(P)}$) of the at least one semicrystalline polyamide (P) is determined by means of differential scanning calorimetry. The melting temperature ($T_{M(P)}$) is typically determined by means of differential scanning calorimetry (DSC) by measuring a heating run (H) and a cooling run (C). This gives a DSC diagram as shown by way of example in FIG. 1. The melting temperature ($T_{M(P)}$) is then taken to be the temperature at which the melting peak of the heating run (H) of the DSC diagram has a maximum. The melting temperature ($T_{M(P)}$) is thus different than the onset temperature of melting ($T_M^{onset}$) described further down. The melting temperature ($T_{M(P)}$) is typically above the onset temperature of melting ($T_M^{onset}$).

The at least one semicrystalline polyamide (P) typically also has a glass transition temperature ($T_{G(P)}$). The glass transition temperature ($T_{G(P)}$) of the at least one semicrystalline polyamide (P) is, for example, in the range from 0° C. to 110° C. and preferably in the range from 40° C. to 105° C., measured in the dry state.

What is meant by "in the dry state" in the context of the present invention is that the at least one semicrystalline polyamide (P) comprises less than 3% by weight, preferably less than 1% by weight and especially preferably less than 0.5% by weight of solvent (LM), preferably water, based in each case on the total weight of the at least one semicrystalline polyamide (P).

In respect of the solvent (LM), the details and preferences hereinafter relating to the solvent (LM) used in step a) are correspondingly applicable.

The glass transition temperature ($T_{G(P)}$) of the at least one semicrystalline polyamide (P) is determined by means of differential scanning calorimetry. The determination is effected in accordance with the invention by first measuring a first heating run (H1), then a cooling run (C), and subsequently a second heating run (H2) on a sample of the at least one semicrystalline polyamide (P) (starting weight about 8.5 g). The heating rate in the first heating run (H1) and in the second heating run (H2) is 20 K/min. The cooling rate in the cooling run (C) is likewise 20 K/min. A step is obtained in the region of the glass transition of the at least one semicrystalline polyamide (P) in the second heating run (H2) in the DSC diagram. The glass transition temperature ($T_{G(P)}$) of the at least one semicrystalline polyamide (P) corresponds to the temperature at half the step height in the DSC diagram. This method of determining the glass transition temperature ($T_G$) is known to those skilled in the art.

The semicrystalline polyamide (P) typically also has a crystallization temperature ($T_{C(P)}$) in the range from 130° C. to 250° C. The crystallization temperature ($T_{C(P)}$) of the semicrystalline polyamide (P) is preferably in the range from 145° C. to 245° C. and especially preferably in the range from 160° C. to 235° C.

In the context of the present invention, the crystallization temperature ($T_{C(P)}$) is likewise determined by means of differential scanning calorimetry (DSC). As described above, this typically involves measuring a heating run (H) and a cooling run (C). This gives a DSC diagram as shown by way of example for the polyamide powder in FIG. 1. The crystallization temperature ($T_{C(P)}$) is then the temperature at the minimum of the crystallization peak of the DSC curve. The crystallization temperature ($T_{C(PP)}$) is thus different to the onset temperature of crystallization ($T_C^{onset}$) described hereinbelow. The crystallization temperature ($T_{C(P)}$) is typically below the onset temperature of crystallization ($T_C^{onset}$).

Step a)

In step a), a solution (L) comprising the at least one semicrystalline polyamide (P) dissolved in a solvent (LM) is produced, wherein the solvent (LM) used is a mixture comprising in the range from 30% to 60% by weight of lactam and in the range from 40% to 70% by weight of water, based on the total weight of the mixture.

According to the invention, "lactam" is understood to mean cyclic amides having 4 to 12 to carbon atoms, preferably 6 to 12 carbon atoms, in the ring.

Suitable lactams are for example selected from the group consisting of 4-aminobutanolactam (γ-lactam; γ-butyrolactam; pyrrolidone), 5-aminopentanolactam (δ-lactam; δ-valerolactam; piperidone), 6-aminohexanolactam (ε-lactam; ε-caprolactam), 7-aminoheptanolactam (ζ-lactam; ζ-heptanolactam), 8-aminooctanolactam (η-lactam; η-octanolactam; caprylolactam), 9-nonanolactam (θ-lactam; θ-nonanolactam), 10-decanolactam (ω-decanolactam; capric lactam), 11-undecanolactam (ω-undecanolactam), and 12-dodecanolactam (ω-dodecanolactam; laurolactam).

The lactams may be unsubstituted or at least monosubstituted. If at least monosubstituted lactams are used, these may bear one, two or more substituents on the carbon atoms of the ring.

Lactams are preferably unsubstituted.

12-dodecanolactam (ω-dodecanolactam) and/or ε-lactam (ε-caprolactam) is particularly preferred, and ε-lactam (ε-caprolactam) is most preferred.

ε-Caprolactam is the cyclic amide of caproic acid. It is also called 6-aminohexanolactam, 6-hexanolactam or caprolactam. Its IUPAC name is "azepan-2-one". Caprolactam has the CAS number 105-60-2 and the general formula $C_6H_{11}NO$. Processes for producing caprolactam are known to those skilled in the art.

In the context of the present invention, the solvent (LM) used is a mixture comprising in the range from 30% to 60% by weight of lactam and in the range from 40% to 70% by weight of water, based on the total weight of the mixture.

The solvent (LM) used is preferably a mixture comprising in the range from 30% to 50% by weight of lactam and in the range from 50% to 70% by weight of water, more preferably in the range from 35% to 45% by weight of lactam and in the range from 55% to 65% by weight of water, based on the total weight of the mixture.

In a further preferred embodiment, the solvent (LM) consists of a mixture of in the range from 30% to 60% by weight of lactam and in the range from 40% to 70% by weight of water, based on the total weight of the mixture.

The preparation of the solution (L) comprises the steps of
a1) mixing a melt (S) comprising the at least one semicrystalline polyamide (P) in molten form with the solvent (LM) in a mixing apparatus (MV) to obtain a dispersion (D) comprising the at least one semicrystalline polyamide (P) dispersed in the solvent (LM), by supplying the melt (S) and the solvent (LM) continuously to the mixing apparatus (MV),
a2) continuously transferring the dispersion (D) obtained in step a1) from the mixing apparatus (MV) into a dwell apparatus (VV) in which the at least one dispersed semicrystalline polyamide (P) dissolves in the solvent (LM) to obtain the solution (L),
wherein the solvent (LM), the dispersion (D) and the solution (L) are kept at a first temperature (T1) in step a2).

Step a1)

In step a1), a melt (S) comprising the at least one semicrystalline polyamide (P) in molten form is mixed with the solvent (LM) in a mixing apparatus (MV) to obtain a dispersion (D).

The mixing can be effected by any method known to those skilled in the art. The mixing apparatus (MV) used may in principle be any mixing apparatus known to those skilled in the art. In the context of the present invention, preference is given to using a dynamic mixing apparatus. Examples of dynamic mixing apparatuses are rotor-stator and rotor-rotor dispersing machines, such as toothed wheel dispersing machines and colloid mills, dynamic flow mixers, inline mixers or mixing pumps.

Preference is given to stirring the melt (S), the solvent (LM) and the resultant dispersion (D) in step a1).

Step a1) affords a dispersion (D). The dispersion (D) comprises the at least one semicrystalline polyamide (P) dispersed in the solvent (LM). The dispersion (D) thus comprises the solvent (LM) as dispersion medium (outer phase) and the at least one polyamide (P) as disperse phase (inner phase).

For example, the dispersion (D) comprises in the range from 1% to 25% by weight of the at least one semicrystalline polyamide (P) and in the range from 75% to 99% by weight of the solvent (LM), based on the total weight of the dispersion (D).

Preferably, the dispersion (D) comprises in the range from 4% to 20% by weight of the at least one semicrystalline polyamide (P) and in the range from 80% to 96% by weight of the solvent (LM), based on the total weight of the dispersion (D).

Most preferably, the dispersion (D) comprises in the range from 7% to 15% by weight of the at least one semicrystalline polyamide (P) and in the range from 85% to 93% by weight of the solvent (LM), based on the total weight of the dispersion (D).

The present invention therefore also provides a process in which the dispersion (D) obtained in step a1) comprises in the range from 1% to 25% by weight of the at least one semicrystalline polyamide (P) and in the range from 75% to 99% by weight of the solvent (LM), based on the total weight of the dispersion (D).

The melt (S) comprising the at least one semicrystalline polyamide (P) in molten form and the solvent (LM) are supplied continuously to the mixing apparatus (MV).

What is meant by "continuous supply" of the melt (S) and of the solvent (LM) in the context of the present invention is that this supply is effected over the entire duration of step a1).

The melt (S) and the solvent (LM) can be supplied by any method known to the person skilled in the art. For example, the melt (S) and the solvent (LM) are supplied to the mixing apparatus (MV) using pumps, each from separate apparatuses ($V_S$) and ($V_{LM}$).

It is possible here to supply the melt (S) and the solvent (LM) to the mixing apparatus (MV) simultaneously from the respective separate apparatuses ($V_S$) and ($V_{LM}$). However, it is also possible that first the solvent (LM) is supplied to the mixing apparatus (MV) from the apparatus ($V_{LM}$) and then the melt (S) from the apparatus ($V_S$). It is preferable that first the solvent (LM) is supplied to the mixing apparatus (MV) from the apparatus ($V_{LM}$) and then the melt (S) from the apparatus ($V_S$).

The apparatus ($V_{LM}$) comprising the solvent (LM) is, for example, a reservoir vessel.

The apparatus ($V_S$) comprising the melt (S) is, for example, an extruder. Suitable extruders include all extruders known to those skilled in the art.

Preference is given to heating the solvent (LM) before it is supplied to the mixing apparatus (MV) to a temperature in the range from 140 to 220° C., more preferably in the range from 160 to 200° C.

The solvent (LM) can be heated here by any method known to the person skilled in the art. For example, the solvent (LM) can be pumped from the reservoir vessel through a heat exchanger into the mixing apparatus (MV) with the aid of a pump.

The melt (S) comprises the at least one semicrystalline polyamide (P) in molten form.

"In molten form" means that the at least one semicrystalline polyamide (P) has a temperature above the melting temperature ($T_{M(P)}$) of the at least one semicrystalline polyamide (P). "In molten form" thus means, in the context of the present invention, that the at least one semicrystalline polyamide (P), before being supplied to the mixing apparatus (MV), is heated in the apparatus ($V_S$) to a temperature above the melting temperature ($T_{M(P)}$) of the at least one semicrystalline polyamide (P). If the at least one semicrystalline polyamide (P) is in molten form, the at least one semicrystalline polyamide (P) is free-flowing.

"Free-flowing" means that the at least one semicrystalline polyamide (P) can be conveyed in the apparatus ($V_S$) and that the at least one semicrystalline polyamide (P) can be extruded out of the apparatus ($V_S$) and conveyed into the mixing apparatus (MV).

It will be clear to the person skilled in the art that, if the at least one semicrystalline polyamide (P) has a temperature above the melting temperature ($T_{M(P)}$) of the at least one semicrystalline polyamide (P), the melt (S) will also have a temperature above the melting temperature ($T_{M(P)}$) of the at least one semicrystalline polyamide (P).

The melt (S) preferably has a temperature (T3) in the range from 200 to 320° C., more preferably in the range from 200 to 290° C. and especially preferably in the range from 200 to 250° C.

The present invention therefore also provides a process in which the melt (S) has a temperature (T3) in the range from 200 to 250° C.

The melt (S) may, as well as the at least one semicrystalline polyamide (P) in molten form, optionally also comprise at least one additive (A).

In the context of the present invention, "at least one additive (A)" means either exactly one additive or a mixture of two or more additives.

Additives as such are known to those skilled in the art. For example, the at least one additive is selected from the group consisting of antinucleating agents, stabilizers, end group functionalizers, dyes and color pigments.

An example of a suitable antinucleating agent is lithium chloride. Suitable stabilizers are, for example, phenols, phosphites and copper stabilizers. Suitable end group functionalizers are, for example, terephthalic acid, adipic acid and propionic acid. Suitable dyes and color pigments are, for example, carbon black and iron chromium oxides.

If the melt (S) additionally comprises at least one additive (A), the at least one additive (A) may likewise be in molten form in the melt (S). It is likewise possible that the at least one additive (A) is in solid form in the melt (S).

"In molten form" in that case means that the at least one additive (A) has a temperature above the melting temperature ($T_{M(A)}$) of the at least one additive (A). "In molten form" in that case thus means that the melt (S) has a temperature above the melting temperature ($T_{M(P)}$) of the at least one additive (A).

"In solid form" in that case means that the at least one additive (A) has a temperature below the melting temperature ($T_{M(A)}$) of the at least one additive (A). "In solid form" in that case thus means that the melt (S) has a temperature below the melting temperature ($T_{M(P)}$) of the at least one additive (A).

In the context of the present invention, the "melt (S)" thus always comprises the at least one semicrystalline polyamide (P) in molten form. The at least one additive (A), by contrast, may also be in solid form in the melt (S).

The at least one semicrystalline polyamide (P) and optionally the at least one additive (A) may be supplied to the apparatus ($V_S$) by any method known to the person skilled in the art. For example, the at least one semicrystalline polyamide (P) may be supplied to the apparatus ($V_S$) in molten or in solid form. The at least one additive (A) may optionally likewise be supplied to the apparatus ($V_S$) in molten or solid form.

When the at least one semicrystalline polyamide (P) is supplied to the apparatus ($V_S$) in solid form, it may be supplied to the apparatus ($V_S$), for example, in the form of pellets and/or of powder. The at least one semicrystalline polyamide (P) may then be melted in the apparatus ($V_S$). This embodiment is preferred.

Correspondingly, it is also optionally possible for the at least one additive (A) to be supplied to the apparatus ($V_S$) in solid form, for example in the form of granules or of powder, preferably of powder, and then optionally to be melted in the apparatus ($V_S$).

In addition, it is possible that the at least one semicrystalline polyamide (P) is first produced directly in the apparatus ($V_S$) and then the at least one additive (A) is optionally supplied to the apparatus ($V_S$).

The at least one semicrystalline polyamide (P) and any at least one additive (A) are preferably compounded in the apparatus ($V_S$) to obtain a compounded mixture (cM).

In the context of the present invention, "compounding" is understood to mean the mixing of the at least one semicrystalline polyamide (P) and any at least one additive (A).

The at least one semicrystalline polyamide (P) and any at least one additive (A) are typically compounded with one another in the amounts in which they are to be present in the compounded mixture (cM) and in the melt (S).

If the compounded mixture (cM) comprises at least one additive (A), typically in the range from 90% to 99.95% by weight of the at least one semicrystalline polyamide (P) and in the range from 0.05% to 10% by weight of the at least one additive (A) are compounded, based in each case on the total weight of the at least one semicrystalline polyamide (P) and of the at least one additive (A).

Preferably in the range from 95% to 99.95% by weight of the at least one semicrystalline polyamide (P) and in the range from 0.05% to 5% by weight of the at least one additive (A) are compounded, based in each case on the total weight of the at least one semicrystalline polyamide (P) and of the at least one additive (A).

More preferably in the range from 98% to 99.95% by weight of the at least one semicrystalline polyamide (P) and in the range from 0.05% to 2% by weight of the at least one additive (A) are compounded, based in each case on the total weight of the at least one semicrystalline polyamide (P) and of the at least one additive (A).

In a further embodiment of the present invention, in the range from 60% to <95% by weight of the at least one semicrystalline polyamide (P) and in the range from >5% to 40% by weight of the at least one additive (A) are compounded, based in each case on the total weight of the at least one semicrystalline polyamide (P) and of the at least one additive (A).

The sum total of the percentages by weight of the at least one semicrystalline polyamide (P) and of the at least one additive (A) is typically 100%.

The at least one semicrystalline polyamide (P) and any at least one additive (A) may react with one another during the compounding. There is preferably no reaction between the at least one semicrystalline polyamide (P) and any at least one additive (A) during the compounding.

It will be appreciated that the percentages by weight of the at least one semicrystalline polyamide (P) and of any at least one additive (A) relate to the percentages by weight before any reaction between the at least one semicrystalline polyamide (P) and the at least one additive (A).

An addition may additionally be compounded with the at least one semicrystalline polyamide (P) and any at least one additive (A). Suitable additions are known to those skilled in the art and are, for example, talc, alkaline earth metal silicates, alkaline earth metal glycerophosphates, fillers, such as glass spheres, glass fibers, carbon fibers, nanotubes and chalk, and also impact-modified polymers, for example based on ethylene-propylene (EPM) or ethylene-propylene-diene (EPDM), rubbers or thermoplastic polyurethanes, flame retardants, plasticizers and/or adhesion promoters.

For example, it is additionally possible to include in the range from 0.1% to 50% by weight of an addition, preferably in the range from 0.1% to 40% by weight and especially preferably in the range from 0.1% to 20% by weight of an addition in the compounding, based in each case on the total weight of the at least one semicrystalline polyamide (P), of any at least one additive (A) and of the addition.

It will be appreciated that, when an addition is additionally included in the compounding, the percentages by weight of the at least one semicrystalline polyamide (P) and/or of any at least one additive (A) are then also based on the total weight of the at least one semicrystalline polyamide (P), of any at least one additive (A) and of the addition.

The sum total of the percentages by weight of the at least one semicrystalline polyamide (P), of any at least one additive (A) and of the addition is then typically 100% by weight.

If the compounded mixture (cM) comprises at least one additive (A), the compounded mixture comprises the at least one additive (A) typically in dispersed form in the at least one semicrystalline polyamide (P).

The at least one additive (A) then forms the disperse phase (inner phase) and the at least one semicrystalline polyamide (P) forms the dispersion medium (continuous phase). The melt (S) comprises the at least one semicrystalline polyamide (P) and any at least one additive (A) typically in the same amounts in which the at least one semicrystalline polyamide (P) and any at least one additive (A) were compounded with one another.

Therefore, the melt (S), if it comprises at least one additive (A), typically comprises in the range from 90% to 99.95% by weight of the at least one semicrystalline polyamide (P) and in the range from 0.05% to 10% by weight of the at least one additive (A), based in each case on the sum total of the percentages by weight of the at least one semicrystalline polyamide (P) and of the at least one additive (A), preferably based on the total weight of the melt (S).

The melt (S) preferably comprises in the range from 95% to 99.95% by weight of the at least one semicrystalline polyamide (P) and in the range from 0.05% to 5% by weight of the at least one additive (A), based in each case on the sum total of the percentages by weight of the at least one semicrystalline polyamide (P) and of the at least one additive (A), preferably based on the total weight of the melt (S).

The melt (S) more preferably comprises in the range from 98% to 99.95% by weight of the at least one semicrystalline polyamide (P) and in the range from 0.05% to 2% by weight of the at least one additive (A), based in each case on the sum total of the percentages by weight of the at least one semicrystalline polyamide (P) and of the at least one additive (A), preferably based on the total weight of the melt (S).

In a further embodiment, the melt (S) comprises in the range from 60% to <95% by weight of the at least one semicrystalline polyamide (P) and in the range from >5% to 40% by weight of the at least one additive (A), based in each case on the sum total of the percentages by weight of the at least one semicrystalline polyamide (P) and of the at least one additive (A), preferably based on the total weight of the melt (S).

It will be apparent that, if an addition has additionally been included in the compounding, then the melt (S) will also comprise the addition.

It will likewise be apparent that, if the melt (S) comprises at least one additive (A) and/or an addition, the dispersion (D) will also comprise the at least one additive (A) and/or the addition. In this case, the percentages by weight of the at least one semicrystalline polyamide (P) and of the solvent (LM) are based on the total weight of the at least one semicrystalline polyamide (P), the solvent (LM) and any at least one additive (A) and/or the addition.

The sum total of the percentages by weight of the at least one semicrystalline polyamide (P), the solvent (LM) and any at least one additive (A) and/or of the addition is then typically 100% by weight.

Step a2)

In step a2), the dispersion (D) obtained in step a1) is transferred continuously from the mixing apparatus (MV) into a dwell apparatus (VV) in which the at least one dispersed semicrystalline polyamide (P) dissolves in the solvent (LM) to obtain the solution (L).

What is meant by "continuous transfer" of the dispersion (D) obtained in step a1) in the context of the present invention is that the corresponding transfer is effected over the entire duration of step a2).

Dwell apparatuses (VV) used may be any dwell apparatuses known to the person skilled in the art. The dwell apparatus (VV) used is preferably a tube or a continuously operated stirred vessel. If a tube is used, the tube is preferably a helical tube section.

The present invention therefore also provides a process in which the dwell apparatus (VV) is a tube or a continuously operated stirred vessel.

If the dwell apparatus (VV) is a stirred vessel, the solvent (LM), the dispersion (D) and the solution (L) are preferably stirred in step a2). Suitable stirrers include all stirrers known to those skilled in the art, for example propeller stirrers, anchor stirrers, cross-beam stirrers, with or without baffles.

The solvent (LM), the dispersion (D) and the solution (L) are kept at a first temperature (T1) in step a2).

The first temperature (T1) at which the solvent (LM), the dispersion (D) and the solution (L) are kept in step a2) depends on the type of the solvent (LM) used, on the at least one semicrystalline polyamide (P) used and on the concentration of the at least one semicrystalline polyamide (P) in the solvent (LM).

For example, the solvent (LM), the dispersion (D) and the solution (L), in step a2), are kept at a first temperature (T1) within the range from 140 to 250° C., preferably within the range from 150 to 240° C. and especially preferably within the range from 170 to 220° C.

The present invention therefore also provides a process in which the first temperature (T1) is in the range from 140 to 250° C.

The temperature (T1) is determined with the aid of a thermometer (PT100) immersed in the solvent (LM), the dispersion (D) and the solution (L) and kept constant by means of a thermostat.

The average dwell time of the solvent (LM), the dispersion (D) and the solution (L) in the dwell apparatus (VV) is preferably 0.1 to 10 hours, more preferably 0.1 to 5 hours.

In the dwell apparatus (VV), the at least one dispersed semicrystalline polyamide (P) dissolves in the solvent (LM). At the end of step a2) or before commencement of step b), the at least one semicrystalline polyamide (P) is fully dissolved in the solvent (LM). This means that the molecules of the at least one semicrystalline polyamide (P) are homogeneously and randomly distributed in the solvent (LM) and that the molecules of the at least one semicrystalline polyamide (P) cannot be separated by filtration.

In one embodiment of the present invention, the at least one dispersed semicrystalline polyamide (P) has already dissolved partly in the solvent (LM) at the end of step a1) or before commencement of step a2). What is meant by "partly" is that the at least one semicrystalline polyamide (P) does not dissolve completely in the solvent (LM). Preferably, the at least one semicrystalline polyamide (P) is dissolved in the solvent (LM) to an extent of at most 50% by weight, more preferably to an extent of at most 40% by weight and especially preferably to an extent of at most 25% by weight, based on the total weight of the at least one semicrystalline polyamide (P).

However, it is preferable that the at least one semicrystalline polyamide (P) does not dissolve in the solvent (LM) before commencement of step a2). If the at least one semicrystalline polyamide (P) does not dissolve in the solvent (LM) before commencement of step a2), the at least one semicrystalline polyamide (P) is dispersed in the solvent (LM). The at least one semicrystalline polyamide (P) then forms the disperse phase (inner phase); the solvent (LM) then forms the dispersion medium (outer phase).

If the dispersion (D) additionally comprises at least one additive (A), the at least one additive (A) may likewise dissolve in the solvent (LM). It is additionally possible that the at least one additive (A) does not dissolve in the solvent (LM).

If the at least one additive (A) does not dissolve in the solvent (LM), the at least one additive (A) is dispersed in the solvent (LM) comprising the at least one semicrystalline polyamide (P) in dissolved form. The at least one additive (A) then forms the disperse phase (inner phase); the solvent (LM) comprising the at least one semicrystalline polyamide (P) in dissolved form then forms the dispersion medium (outer phase).

Any additions present in the dispersion (D) may likewise be dissolved in the solvent (LM). It is likewise possible that the additions do not dissolve in the solvent (LM) and are dispersed in the solvent (LM) comprising the at least one semicrystalline polyamide (P) in dissolved form.

Step b)

In step b), the solution (L) obtained in step a) is transferred continuously from the dwell apparatus (VV) into a precipitation apparatus (FV), with cooling of the solution (L) obtained in step a) in the precipitation apparatus (FV) to a second temperature (T2) to obtain a suspension (S) comprising the polyamide powder (PP) as suspended phase and the solvent (LM) as continuous phase.

What is meant by "continuous transfer" of the solution (L) obtained in step a) in the context of the present invention is that the corresponding transfer is effected over the entire duration of step b).

The second temperature (T2) to which the solution (L) obtained in step a) is cooled in step b) depends on the solvent (LM) used, on the at least one semicrystalline polyamide (P) and on the concentration of the at least one semicrystalline polyamide (P) in the solvent (LM).

For example, the solution (L) obtained in step a) is cooled in step b) to a second temperature (T2) in the range from 0° C. to less than 140° C., preferably in the range from 5° C. to less than 135° C. and especially preferably in the range from 10° C. to less than 130° C.

The present invention therefore also provides a process in which the second temperature (T2) is in the range from 0 to less than 140° C.

It will be apparent that the second temperature (T2) to which the solution (L) is cooled in step b) is below the first temperature (T1) at which the solvent (LM), the dispersion (D) and the solution (L) are kept in step a1).

The temperature (T2) is determined with the aid of a thermometer (PT100) immersed in the solution (L) and kept constant by means of a thermostat.

The average dwell time of the solution (L) in the precipitation apparatus (FV) is 0.1 to 2 hours, preferably 0.2 to 1.5 hours and especially preferably 0.3 to 1 hour.

The cooling can be effected by any method known to those skilled in the art.

The cooling of the solution (L) in step b) can be effected either in one step or in multiple steps.

If the cooling of the solution (L) in step b) is effected in one step, step b) is typically performed in a single reactor to obtain the suspension (S). Preferably, however, the cooling of the solution (L) in step b) is effected in multiple steps, more preferably in two steps.

If the cooling of the solution (L) in step b) is effected in two steps, the solution (L) is cooled in a first step b1) to a temperature (T2a) to obtain a suspension (S1) and the suspension (S1) is cooled in a second step b2) to a temperature (T2b) to obtain the suspension (S).

The present invention therefore also provides a process in which the cooling of the solution (L) in step b) is effected in two steps, with cooling of the solution (L) in a first step b1) to a temperature (T2a) to obtain a suspension (S1) and cooling of the suspension (S1) in a second step b2) to a temperature (T2b) to obtain the suspension (S).

The temperature (T2a) is preferably in the range from 100 to less than 140° C., more preferably in the range from 100 to less than 135° C. and especially preferably in the range from 100 to less than 125° C.

The temperature (T2b) is preferably in the range from 0 to less than 100° C., more preferably in the range from 5 to less than 100° C. and especially preferably in the range from 10 to less than 100° C.

The present invention therefore also provides a process in which the temperature (T2a) is in the range from 100 to less than 140° C.

In addition, the present invention also provides a process in which the temperature (T2b) is in the range from 0 to less than 100° C.

If the solution (L) is cooled in step b) in two steps, step b1) is preferably performed in a first reactor (R1) and step b2) is preferably performed in a second reactor (R2).

The present invention therefore also provides a process in which step b1) is performed in a first reactor (R1) and step b2) in a second reactor (R2).

It will thus be apparent that the term "precipitation apparatus (FV)" in the context of the present invention may comprise either one reactor or more than one reactor.

Suitable reactors in which the solution (L) or the suspension (51) can be cooled are, for example, continuous stirred tanks or tubular reactors. However, preference is given to using continuous stirred tanks for the cooling of the solution (L) in step b).

The cooling of the solution (L) obtained in step a) affords a suspension (S) comprising the polyamide powder (PP) as suspended phase (inner phase) and the solvent (LM) as continuous phase.

The polyamide powder (PP) is described in detail further down.

The suspension (S) typically comprises in the range from 1% to 25% by weight of the polyamide powder (PP) and in the range from 75% to 99% by weight of the solvent (LM), based in each case on the total weight of the suspension (S).

The suspension (S) preferably comprises in the range from 4% to 20% by weight of the polyamide powder (PP) and in the range from 80% to 96% by weight of the solvent (LM), based on the total weight of the suspension (S).

The suspension (S) most preferably comprises in the range from 7% to 15% by weight of the polyamide powder (PP) and in the range from 85% to 93% by weight of the solvent (LM), based on the total weight of the suspension (S).

It will be apparent that, if the solution (L) comprises at least one additive (A) and/or an addition, the polyamide powder (PP) will also comprise the at least one additive (A) and/or the addition.

Step c)

In step c), the polyamide powder (PP) is separated from the suspension (S) obtained in step b).

The polyamide powder (PP) can be separated off by any method known to the person skilled in the art, for example by filtration and/or centrifugation. In step c), the polyamide powder (PP) is thus separated from the solvent (LM) of the suspension (S).

The polyamide powder (PP) thus obtained may optionally be subjected to further workup. In a preferred embodiment, the polyamide powder (PP) is washed with water in order to remove any residues of the solvent (LM) present from the polyamide powder (PP).

In a further preferred embodiment, the polyamide powder (PP), after being separated off in step c), is washed with water and subsequently dried.

This drying may be a thermal drying operation. Preferred thermal drying methods are, for example, drying in a fluidized bed supplied with hot air or drying under a nitrogen atmosphere and/or under reduced pressure at elevated temperatures, for example in the range from 50° C. to 80° C.

The present invention therefore also provides a process in which the polyamide powder (PP) is separated off in step c) by filtration and/or centrifugation and subsequent drying.

In some cases, it may be advantageous to classify the polyamide powder (PP) after it has been separated off in process step c). For this purpose, the polyamide powder (PP) may be subjected to sieving and/or windsifting. Windsifting generally separates particles that are too fine from the polyamide powder (PP). Sieving generally separates particles of excessive particle size from the polyamide powder (PP). It is possible to perform a sieving operation only or a windsifting operation only. It is additionally also possible to perform a sieving operation and subsequently a windsifting operation, or a windsifting operation and subsequently a sieving operation. It is additionally also possible to use the polyamide powder (PP) directly as sinter powder after it has been separated off in process step c).

Polyamide Powder (PP)

The polyamide powder (PP) of the invention comprises at least one semicrystalline polyamide (P). The polyamide powder (PP) of the invention may comprise the at least one semicrystalline polyamide (P) in any desired amount.

Typically, the polyamide powder (PP) comprises the at least one semicrystalline polyamide (P) in the amount in which the melt (S) in step a1) also comprises the at least one semicrystalline polyamide (P).

If the melt (S) consists entirely of the at least one semicrystalline polyamide (P), the polyamide powder (PP) of the invention typically also consists entirely of the at least one semicrystalline polyamide (P).

What is meant by "entirely" in the context of the present invention is that the polyamide powder (PP) comprises 100% by weight of the at least one semicrystalline polyamide (P), based on the total weight of the polyamide powder (PP).

If the melt (S) in step a1) also comprises at least one additive (A) as well as the at least one semicrystalline polyamide (P), the polyamide powder (PP) typically also comprises the at least one semicrystalline polyamide (P) and the at least one additive (A). Preferably, the polyamide powder (PP) comprises the at least one semicrystalline polyamide (P) and the at least one additive (A) in the amounts in which the melt (S) also comprises the at least one semicrystalline polyamide (P) and the at least one additive (A).

For example, the polyamide powder (PP) comprises in the range from 95% to 99.95% by weight of the at least one semicrystalline polyamide (P) and in the range from 0.05% to 5% by weight of the at least one additive (A) based on the total weight of the polyamide powder (PP).

The polyamide powder (PP) preferably comprises in the range from 98% to 99.95% by weight of the at least one semicrystalline polyamide (P) and in the range from 0.05% to 2% by weight of the at least one additive (A) based on the total weight of the polyamide powder (PP).

In a further embodiment, the polyamide powder (PP) comprises in the range from 60% to <95% by weight of the at least one semicrystalline polyamide (P) and in the range from >5% to 40% by weight of the at least one additive (A), based in each case on the total weight of the polyamide powder (PP).

In this embodiment, the polyamide powder (PP) preferably comprises in the range from 95% to 99.95% by weight of the at least one semicrystalline polyamide (P) and in the range from 0.05% to 5% by weight of the at least one additive (A), based in each case on the total weight of the polyamide powder (PP).

In this embodiment, the polyamide powder (PP) most preferably comprises in the range from 98% to 99.95% by weight of the at least one semicrystalline polyamide (P) and in the range from 0.05% to 2% by weight of the at least one additive (A), based in each case on the total weight of the polyamide powder (PP).

It will be apparent that, when the melt (S) in step a1) additionally comprises an addition, then the polyamide powder (PP) obtained in step c) will also comprise this addition. Typically, the polyamide powder (PP) then comprises this addition in the amounts in which the melt (S) also comprises the addition.

The polyamide powder (PP) may also further comprise residues of the solvent (LM).

"Residues" of the solvent (LM) are understood to mean, for example, in the range from 0.01% to 5% by weight of the solvent (LM), preferably in the range from 0.1% to 3% by weight and especially preferably in the range from 0.1% to 1% by weight of the solvent (LM), based in each case on the total weight of the polyamide powder (PP).

When the polyamide powder (PP) comprises in the range from >5% to 50% by weight of the at least one additive (A), preferably in the range from 10% to 40% by weight of the at least one additive (A) and especially preferably in the range from 10% to 30% by weight of the at least one additive (A), based in each case on the total weight of the polyamide powder (PP), then the polyamide powder (PP) is what is called a masterbatch. Such a masterbatch is typically diluted with further semicrystalline polyamide (P) before use, for example in a selective laser sintering process and/or for producing shaped bodies. Such processes are known to the person skilled in the art.

If the polyamide powder comprises an additive (A), the at least one additive (A) is typically dispersed in the at least one semicrystalline polyamide (P) in the polyamide powder (PP). The at least one additive (A) then forms the disperse phase (inner phase) and the at least one semicrystalline polyamide (P) forms the dispersion medium (outer phase).

The polyamide powder (PP) typically has a melting temperature ($T_{M(PP)}$) in the range from 180° C. to 270° C. The melting temperature ($T_{M(PP)}$) of the polyamide powder (PP) is preferably in the range from 185° C. to 260° C. and especially preferably in the range from 190° C. to 245° C.

In the context of the present invention, the melting temperature ($T_{M(PP)}$) of the polyamide powder (PP) is determined by means of differential scanning calorimetry (DSC). A heating run (H) and a cooling run (C) are typically measured. This gives a DSC diagram as shown by way of example in FIG. 1. The melting temperature ($T_{M(PP)}$) is then understood to mean the temperature at which the melting peak of the heating run (H) of the DSC diagram has a maximum. The melting temperature ($T_{M(PP)}$) is thus different to the onset temperature of melting ($T_M^{onset}$) described hereinbelow. The melting temperature ($T_{M(PP)}$) is typically above the onset temperature of melting ($T_M^{onset}$).

The polyamide powder (PP) typically also has a crystallization temperature ($T_{C(PP)}$) in the range from 120° C. to 250° C. The crystallization temperature ($T_{C(PP)}$) of the polyamide powder (PP) is preferably in the range from 130° C. to 240° C. and especially preferably in the range from 140° C. to 235° C.

In the context of the present invention the crystallization temperature ($T_{C(PP)}$) is likewise determined by means of differential scanning calorimetry (DSC). As described above, this typically involves measuring a heating run (H) and a cooling run (C). A DSC diagram as shown by way of example in FIG. 1 is obtained. The crystallization temperature ($T_{C(PP)}$) is then the temperature at the minimum of the crystallization peak of the DSC curve. The crystallization temperature ($T_{C(PP)}$) is thus different to the onset temperature of crystallization ($T_C^{onset}$) described hereinbelow.

The polyamide powder (PP) typically also has a glass transition temperature ($T_{G(P)}$). The glass transition temperature ($T_{G(PP)}$) of the polyamide powder (PP) is typically in the range from 0° C. to 110° C., preferably in the range from 40° C. to 105° C. and especially preferably in the range from 40° C. to 105° C.

The glass transition temperature ($T_{G(PP)}$) of the polyamide powder (PP) is determined by means of differential scanning calorimetry. According to the invention determination is achieved by measuring initially a first heating run (H1), then a cooling run (C) and subsequently a second heating run (H2) on a sample of the polyamide powder (PP) (starting weight about 8.5 g). The heating rate in the first heating run (H1) and in the second heating run (H2) is 20 K/min; the cooling rate in the cooling run (C) is likewise 20 K/min. A step is obtained in the region of the glass transition of the polyamide powder (PP) in the second heating run (H2) in the DSC diagram. The glass transition temperature ($T_{G(PP)}$) of the polyamide powder (PP) corresponds to the temperature at half of the step height in the DSC diagram. This method of determining the glass transition temperature is known to those skilled in the art.

The polyamide powder (PP) typically also has a sintering window ($W_{PP}$). The sintering window ($W_{PP}$) is, as more particularly elucidated hereinbelow, the difference between the onset temperature of melting ($T_M^{onset}$) and the onset temperature of crystallization ($T_C^{onset}$). The onset temperature of melting ($T_M^{onset}$) and the onset temperature of crystallization ($T_C^{onset}$) are determined as described below.

The sintering window ($W_{PP}$) of the polyamide powder (PP) is preferably in the range from 15 to 40 K (Kelvin), particularly preferably in the range from 20 to 35 K and especially preferably in the range from 20 to 30 K.

The present invention accordingly also provides a polyamide powder (PP) obtainable by the process according to the invention.

On account of the properties of the polyamide powder (PP) described hereinabove the polyamide powder (PP) according to the invention is particularly suitable as a sintering powder (SP).

The present invention accordingly also provides for the use of a polyamide powder (PP) according to the invention as a sintering powder (SP).

The present invention further provides a process for producing a shaped body by exposing a layer of a polyamide powder (PP) of the invention.

Exposure

Exposure melts at least part of the layer of the polyamide powder (PP). The molten polyamide powder (PP) coalesces and forms a homogeneous melt. After the exposure, the molten part of the layer of the polyamide powder (PP) cools down again and the homogeneous melt solidifies again.

Suitable methods of exposure include all methods known to those skilled in the art. The exposure is preferably effected with a radiation source. The radiation source is preferably selected from the group consisting of infrared sources and lasers. Especially preferred infrared sources are near infrared sources.

Suitable lasers are known to those skilled in the art and are for example fiber lasers, Nd:YAG lasers (neodymium-doped yttrium aluminum garnet laser) or carbon dioxide lasers.

If the radiation source used in the exposure is a laser, the layer of the polyamide powder (PP) is typically exposed locally and briefly to the laser beam. This selectively melts just the parts of the polyamide powder (PP) that have been exposed to the laser beam. If a laser is used, the method is referred to as selective laser sintering. Selective laser sintering is known per se to those skilled in the art.

If the radiation source used in the exposing is an infrared source, especially a near infrared source, the wavelength at which the radiation source radiates is typically in the range from 780 nm to 1000 μm, preferably in the range from 780 nm to 50 μm and especially in the range from 780 nm to 2.5 μm.

The exposure then typically exposes the entire layer of the polyamide powder (PP). In order that only the desired regions of the polyamide powder (PP) melt in the exposure, an infrared-absorbing ink (IR-absorbing ink) is typically applied to the regions that are to melt.

Suitable IR-absorbing inks are all IR-absorbing inks known to those skilled in the art, especially IR-absorbing inks known to those skilled in the art for high-speed sintering.

IR-absorbing inks typically comprise at least one absorber that absorbs IR radiation, preferably NIR radiation (near infrared radiation). In the exposure of the layer of the polyamide powder (PP), the absorption of the IR radiation, preferably the NIR radiation, by the IR absorber present in the IR-absorbing inks results in selective heating of the part of the layer of the polyamide powder (PP) to which the IR-absorbing ink has been applied.

The IR-absorbing ink may, as well as the at least one absorber, comprise a carrier liquid. Suitable carrier liquids are known to those skilled in the art and are, for example, oils or solvents.

The at least one absorber one absorber may be dissolved or dispersed in the carrier liquid.

If the exposure is effected with a radiation source selected from infrared sources and an IR-absorbing ink is applied, the process is then also referred to as high-speed sintering (HSS) or multijet fusion (MJF) method. These processes are known per se to those skilled in the art.

After the exposure, the layer of the polyamide powder (PP) is typically lowered by the layer thickness of the layer of the polyamide powder (PP) provided and a further layer of the polyamide powder (PP) is applied. The latter is then exposed again.

This firstly bonds the upper layer of the polyamide powder (PP) to the lower layer of the polyamide powder (PP); in addition, the particles of the polyamide powder (PP) within the upper layer are bonded to one another by fusion.

The exposure can thus be repeated.

By repeating the lowering of the powder bed, the applying of the polyamide powder (PP) and the exposure and hence the melting of the polyamide powder (PP), three-dimensional shaped bodies are produced. It is possible to produce shaped bodies that also have cavities, for example. No additional support material is necessary since the unmolten polyamide powder (PP) itself acts as a support material.

A factor of particular significance in the process is the melting range of the polyamide powder (PP), called the sintering window (WSP) of the polyamide powder (PP).

The sintering window (WSP) of the polyamide powder (PP) can be determined by differential scanning calorimetry (DSC) for example.

In differential scanning calorimetry, the temperature of a sample, i.e. in the present case a sample of the polyamide powder (PP), and the temperature of a reference are altered linearly over time. To this end, heat is supplied to/removed from the sample and the reference. The amount of heat Q necessary to keep the sample at the same temperature as the reference is determined. The amount of heat QR supplied to/removed from the reference serves as a reference value.

If the sample undergoes an endothermic phase transformation, an additional amount of heat Q must be supplied to keep the sample at the same temperature as the reference. If an exothermic phase transformation takes place, an amount of heat Q has to be removed to keep the sample at the same temperature as the reference. The measurement affords a DSC diagram in which the amount of heat Q supplied to/removed from the sample is plotted as a function of temperature T.

Measurement typically involves initially performing a heating run (H), i.e. the sample and the reference are heated in a linear manner. During the melting of the sample (solid/liquid phase transformation), an additional amount of heat Q has to be supplied to keep the sample at the same temperature as the reference. In the DSC diagram, a peak known as the melting peak is then observed.

After the heating run (H), a cooling run (C) is typically measured. This involves cooling the sample and the reference linearly, i.e. heat is removed from the sample and the reference. During the crystallization/solidification of the sample (liquid/solid phase transformation), a greater amount of heat Q has to be removed to keep the sample at the same temperature as the reference, since heat is liberated in the course of crystallization/solidification. In the DSC diagram of the cooling run (C), a peak, called the crystallization peak, is then observed in the opposite direction from the melting peak.

In the context of the present invention, the heating during the heating run is typically effected at a heating rate of 20 K/min. The cooling during the cooling run in the context of the present invention is typically effected at a cooling rate of 20 K/min.

A DSC diagram comprising a heating run (H) and a cooling run (C) is depicted by way of example in FIG. 1. The DSC diagram can be used to determine the onset temperature of melting ($T_M^{onset}$) and the onset temperature of crystallization ($T_C^{onset}$).

To determine the onset temperature of melting ($T_M^{onset}$), a tangent is drawn against the baseline of the heating run (H) at the temperatures below the melting peak. A second tangent is drawn against the first point of inflection of the melting peak at temperatures below the temperature at the maximum of the melting peak. The two tangents are extrapolated until they intersect. The vertical extrapolation of the intersection to the temperature axis denotes the onset temperature of melting ($T_M^{onset}$).

To determine the onset temperature of crystallization ($T_C^{onset}$), a tangent is drawn against the baseline of the cooling run (C) at the temperatures above the crystallization peak. A second tangent is drawn against the point of inflection of the crystallization peak at temperatures above the temperature at the minimum of the crystallization peak. The two tangents are extrapolated until they intersect. The vertical extrapolation of the intersection to the temperature axis indicates the onset temperature of crystallization ($T_C^{onset}$).

The sintering window (W) results from the difference between the onset temperature of melting ($T_M^{onset}$) and the onset temperature of crystallization ($T_M^{onset}$). Thus:

$$W = T_M^{onset} - T_C^{onset}.$$

In the context of the present invention, the terms "sintering window (WSP)", "size of the sintering window (WSP)" and "difference between the onset temperature of melting ($T_M^{onset}$) and the onset temperature of crystallization ($T_C^{onset}$)" have the same meaning and are used synonymously.

The present invention is elucidated in detail by the examples which follow, but without limiting it thereto.

Step a)

A solution (L) comprising nylon-6 (Ultramid B27, BASF SE, Ludwigshafen) dissolved in a solvent (LM) was produced, the solvent (LM) being a mixture of caprolactam in water (caprolactam content 42% by weight).

Step a1)

First of all, a melt (S) of nylon-6 was mixed with the solvent (LM) in a dynamic mixing apparatus (MV) (DLM/S-007 flow mixer, from INDAG, D-25376 Borsfleth) to obtain a dispersion (D). The melt (S) and the solvent (LM) were each supplied continuously to the dynamic mixing apparatus (MV) from an extruder (Collin Single Screw E16T, Dr. Collin GmbH, D-85560 Ebersberg) and a reservoir vessel with the aid of a three-piston membrane pump from LEWA GmbH, D-71229 Leonberg. The nylon-6 was supplied beforehand to the extruder in the form of pellets with a throughput of 450 g/h and then melted in the extruder to obtain the melt (S). The melt (S) is at a temperature of 230° C. The solvent (LM) is pumped into the mixing apparatus (MV) at a throughput of 4500 g/h with the aid of a heat exchanger and is at a temperature between 170 and 180° C.

Step a2)

Thereafter, the dispersion (D) obtained in step a1) is transferred continuously from the dynamic mixing apparatus (MV) into a dwell apparatus (VV) (helical tube zone, volume 2.5 liters), in which the dispersed nylon-6 dissolves in the solvent (LM) to obtain the solution (L). The solvent (LM), the dispersion (D) and the solution (L) are kept at a temperature of 175° C.

Step b)

The solution (L) obtained in step a) was transferred continuously from the dwell apparatus (VV) into a precipitation apparatus (FV), with cooling of the solution (L) obtained in step a) in the precipitation apparatus (FV) to obtain a suspension (S) comprising the polyamide powder (PP) as suspended phase and the solvent (LM) as continuous phase. The precipitation apparatus (FV) used was two continuously operated stirred tanks, and the cooling was effected in two steps. In the first stirred tank (volume 2.4 liters), the solution (L) was cooled down to a temperature of 115° C. to obtain a suspension (S1); in the second stirred tank (volume 6.4 liters), the suspension (S1) was cooled down to a temperature of <50° C. to obtain a suspension (S).

Step c)

The polyamide powder (PP) is separated from the suspension (S) obtained in step b) by filtration, washing and drying.

The polyamide powder (PP) of the invention has, for example, the following particle size distribution:

D10 of 8.4 µm
D50 of 36 µm
D90 of 95 µm

In the context of the present invention, the "D10" is understood to mean the particle size at which 10% by volume of the particles based on the total volume of the particles are smaller than or equal to the D10 and 90% by volume of the particles based on the total volume of the particles are larger than the D10. By analogy, the "D50" is understood to mean the particle size at which 50% by volume of the particles based on the total volume of the particles are smaller than or equal to the D50 and 50% by volume of the particles based on the total volume of the particles are larger than the D50. Correspondingly, the "D90" is understood to mean the particle size at which 90% by volume of the particles based on the total volume of the particles are smaller than or equal to the D90 and 10% by volume of the particles based on the total volume of the particles are larger than the D90.

To determine the particle sizes, the polyamide powder (PP) is suspended in a dry state by means of compressed air or in a solvent, for example water or ethanol, and this suspension is analyzed. The D10, D50 and D90 are determined by means of laser diffraction using a Malvern Mastersizer 3000. Evaluation is by means of Fraunhofer diffraction.

The invention claimed is:

1. A process for continuously producing a polyamide powder (PP) comprising at least one semicrystalline polyamide (P), comprising the steps of
   a) producing a solution (L) comprising the at least one semicrystalline polyamide (P) dissolved in a solvent (LM), wherein the solvent (LM) used is a mixture comprising in the range from 30% to 60% by weight of lactam and in the range from 40% to 70% by weight of water, based on the total weight of the mixture, comprising the steps of
      a1) mixing a melt (S) comprising the at least one semicrystalline polyamide (P) in molten form with the solvent (LM) in a mixing apparatus (MV) to obtain a dispersion (D) comprising the at least one semicrystalline polyamide (P) dispersed in the solvent (LM), by supplying the melt (S) and the solvent (LM) continuously to the mixing apparatus (MV),
      a2) continuously transferring the dispersion (D) obtained in step a1) from the mixing apparatus (MV) into a dwell apparatus (VV) in which the at least one dispersed semicrystalline polyamide (P) dissolves in the solvent (LM) to obtain the solution (L),
   wherein the solvent (LM), the dispersion (D) and the solution (L) are kept at a first temperature (T1) in step a2),
   b) continuously transferring the solution (L) obtained in step a) from the dwell apparatus (VV) into a precipitation apparatus (FV), wherein the solution (L) obtained in step a) is cooled in the precipitation apparatus (FV) to a second temperature (T2) to obtain a suspension (S) comprising the polyamide powder (PP) as suspended phase and the solvent (LM) as continuous phase,
   c) separating the polyamide powder (PP) from the suspension (S) obtained in step b).

2. The process according to claim 1, wherein the first temperature (T1) is in the range from 140 to 250° C.

3. The process according to claim 1, wherein the second temperature (T2) is in the range from 0 to less than 140° C.

4. The process according to claim 1, wherein the solution (L) is cooled in two steps in step b), with cooling of the solution (L) in a first step b1) to a temperature (T2a) to obtain a suspension (S1) and cooling of the suspension (S1) in a second step b2) to a temperature (T2b) to obtain the suspension (S).

5. The process according to claim 4, wherein step b1) is performed in a first reactor (R1) and step b2) in a second reactor (R2).

6. The process according to claim 4, wherein the temperature (T2a) is in the range from 100 to less than 140° C.

7. The process according to claim 4, wherein the temperature (T2b) is in the range from 0 to less than 100° C.

8. The process according to claim 1, wherein the melt (S) has a temperature (T3) in the range from 200 to 250° C.

9. The process according to claim 1, wherein the at least one semicrystalline polyamide (P) is selected from the group consisting of PA 4, PA 6, PA 7, PA 8, PA 9, PA 11, PA 12, PA 46, PA 66, PA 69, PA 610, PA 612, PA 613, PA 1212, PA 1313, PA 6T, PA MXD6, PA 6/6T, PA 6/6I, PA 6/6I6T, PA 6.36, PA 6/66, PA 6/12, PA 66/6/610, PA PACM12, PA 6I/6T/PACM and copolyamides of two or more of the above mentioned polyamides.

10. The process according to claim 1, wherein the dispersion (D) obtained in step a1) comprises in the range from 1% to 25% by weight of the at least one semicrystalline polyamide (P) and in the range from 75% to 99% by weight of the solvent (LM), based on the total weight of the dispersion (D).

11. The process according to claim 1, wherein the dwell apparatus (VV) is a tube or a continuously operated stirred vessel.

12. The process according to claim 1, wherein the separation of the polyamide powder (PP) in step c) is effected by filtration and/or centrifugation and subsequent drying.

* * * * *